United States Patent [19]

Poussin et al.

[11] Patent Number: 5,456,385
[45] Date of Patent: Oct. 10, 1995

[54] ENCLOSURE CONTAINING SEVERAL BEDS OF SOLID MATERIAL SEPARATED AND UNLOADABLE BY GRAVITY WITHOUT MIXING MATERIAL

[75] Inventors: Bernard Poussin, Carrieres sur Seine; Jean-Paul LePage, Rueil Malmaison; Roland Huin, Montesson la Borde, all of France

[73] Assignee: Institut Francais du Petrole, Rueil Malmaison, France

[21] Appl. No.: 311,785

[22] Filed: Sep. 26, 1994

Related U.S. Application Data

[63] Continuation-in-part of Ser. No. 36,578, Mar. 24, 1993, abandoned.

[30] Foreign Application Priority Data

Mar. 25, 1992 [FR] France ................................ 92 03696

[51] Int. Cl.[6] ................................................ G01F 11/00
[52] U.S. Cl. ............................. 222/1; 222/129; 222/556; 222/153.03; 422/191; 422/216; 422/232
[58] Field of Search ............................ 222/1, 153, 185, 222/145, 129, 556; 414/147, 160, 199, 200, 216, 217; 422/191, 216, 218, 219, 232, 233, 310

[56] References Cited

U.S. PATENT DOCUMENTS

| 39,372 | 8/1863 | Barkley | 414/216 |
|---|---|---|---|
| 822,787 | 6/1906 | Smith | 414/200 |
| 2,292,716 | 8/1942 | Pyzel | 210/134 |
| 2,327,175 | 8/1943 | Conn | 422/219 |
| 2,388,451 | 11/1945 | Tobiasson | 422/191 |
| 2,485,316 | 10/1949 | Robbins, Jr. et al. | 251/51 |
| 2,635,071 | 4/1953 | Atwood et al. | 422/219 |
| 2,766,002 | 10/1956 | Banks | 249/60 |
| 2,893,945 | 7/1959 | Berg | 422/216 |
| 2,899,285 | 8/1959 | Carr | 422/219 |
| 3,139,472 | 6/1964 | Evans | 414/200 |
| 3,573,337 | 4/1971 | Grimm et al. | 414/200 |
| 4,483,206 | 11/1984 | Thompson | 422/219 |
| 4,642,223 | 2/1987 | Al-Saigh | 422/191 |
| 4,752,359 | 6/1988 | Sundermann et al. | 414/199 |

FOREIGN PATENT DOCUMENTS

| 1366401 | 8/1963 | France . |
| 2607569 | 3/1988 | France . |
| 864991 | 4/1961 | United Kingdom . |

OTHER PUBLICATIONS

*Patent Abstracts of Japan*, vol. 12, No. 237 (C–509), Jul. 6, 1988 (abstract of JP–A–63 028 440 of Feb. 6, 1988).

*Primary Examiner*—Kevin P. Shaver
*Attorney, Agent, or Firm*—Millen, White, Zelano & Branigan

[57] ABSTRACT

A process for discharging solids from a vessel having at least three successive beds of solid particulate material with at least two of the beds being of different solid material than the other. The process comprises opening a lowermost closure and discharging the lowermost bed from the vessel while maintaining other closures in closed positions. After discharging the lowermost bed, opening the next-to-lowermost closure to permit the next-to-lowermost bed of solids to replace the lowermost bed, and repeating this operation up through all the beds without mixing of the beds, and discharging each bed separately from the vessel.

20 Claims, 6 Drawing Sheets

ENCLOSURE CONTAINING SEVERAL BEDS OF SOLID MATERIAL SEPARATED AND UNLOADABLE BY GRAVITY WITHOUT MIXING MATERIAL

This application is a continuation-in-part of application Ser. No. 08/036,578, filed Mar. 24, 1993, now abandoned.

BACKGROUND OF THE INVENTION

The invention concerns a vessel containing a plurality of separate beds of solid material, which beds can be discharged by gravity without mixing of material.

That vessel may be a reactor, a silo, etc.

The problem is found in particular in relation to reactors for the hydro-treatment of petroleum fractions, containing a plurality of separate, superposed catalytic beds, each bed containing a catalyst supported by a support plate. The support plates provide for separation as between the beds. The solid material is loaded into the vessel from an opening provided in the upper portion of the vessel.

The catalysts are not in the same state after operation, the problem at discharge being to avoid mixing thereof, which would inevitably occur if all the beds were discharged simultaneously at the bottom.

This problem also obviously arises when the beds are loaded with different catalysts.

In U.S. Pat. No. 4,642,223, at least one pipe is mounted on each support plate. The pipes of the highest support plate (corresponding to the bed which is closest to the upper opening of the vessel) are provided with removable baskets (which can be removed by a handle which can be pulled upwardly when the upper bed has been discharged) which are supported on the upper edge of the pipe and which provide for continuity of the support plate. The baskets then permit discharge of the upper bed by suction from the upper opening of the reactor. The pipes of the lower beds then do not have to comprise baskets so that discharge of the lower beds is effected by a flow under the effect of gravity from all the beds at the same time. The problem raised thus still remains entirely to be resolved.

U.S. Pat. No. 2,292,716 recommends the use of a rotary plate composed of two circular semi-sections which are fixed at their common diameter to a central beam about which they pivot. Each section of the plate bearing the catalytic bed is supported on at least one retractable bar member mounted in an opening in the wall of the reactor and retractable from the exterior of the reactor. Retraction of the bar member or members permits abrupt discharge of the catalyst. This in fact involves the material dropping on to the lower plate. In present installations in which the beds are frequently from 5 to 7 meters in height, it is clear that this drop can give rise to shocks, vibration and fractures of the lower plate and even the structure of the reactor. In addition, besides the problems in regard to sealing integrity, which are not overcome, it is clearly apparent that such plates are incapable of affording the necessary mechanical strength for supporting beds which generally weigh from 30 to 40 tonnes.

SUMMARY OF THE INVENTION

Therefore, in a first object, the applicants sought a solution which can be adapted to the present industrial units and which permits controlled discharge without mechanical damage and separately of beds of solid material.

Another aim on the part of the applicants is to avoid discharge by a suction effect. Indeed, in the method involving suction, a flexible hose is fitted at the level of the highest bed and its catalyst is sucked off, then if the lower bed is also to be discharged by suction, the hose is fitted to the bed below, and so on. In order to regulate the suction rate, a man must be present in the reactor. Now, when the catalyst is not regenerated, that operation is carried out in a nitrogen atmosphere, which necessitates the use of substantial means to guarantee operator safety.

In addition the suction operation breaks the catalyst to a certain extent, which means it is necessary to add a make-up amount of catalyst (10 to 15%) while also having an adverse effect on operating costs.

The applicants are therefore proposing a vessel which is suited to the present capacities, permitting the use of beds of different material, and which is provided with means permitting gravitational discharge of the beds separately without necessarily having to involve human intervention in the actual vessel.

More precisely the invention concerns a vertical or inclined vessel comprising successive, separate superposed beds of solid material, which solid materials may be different, and the solid material in each bed being supported by a support plate, comprising at least one pipe connecting the successive beds, at least one pipe of each plate is provided with a closure means connected to a means for remote control of opening thereof, and said vessel comprises at least one opening in its upper portion for charging of the beds and at least one opening in its lower portion for the discharge of solid material.

BRIEF DESCRIPTION OF THE FIGURES

The invention will be better appreciated with reference to the description of the Figures.

DETAILED DESCRIPTION OF THE FIGURES

Figure 1:
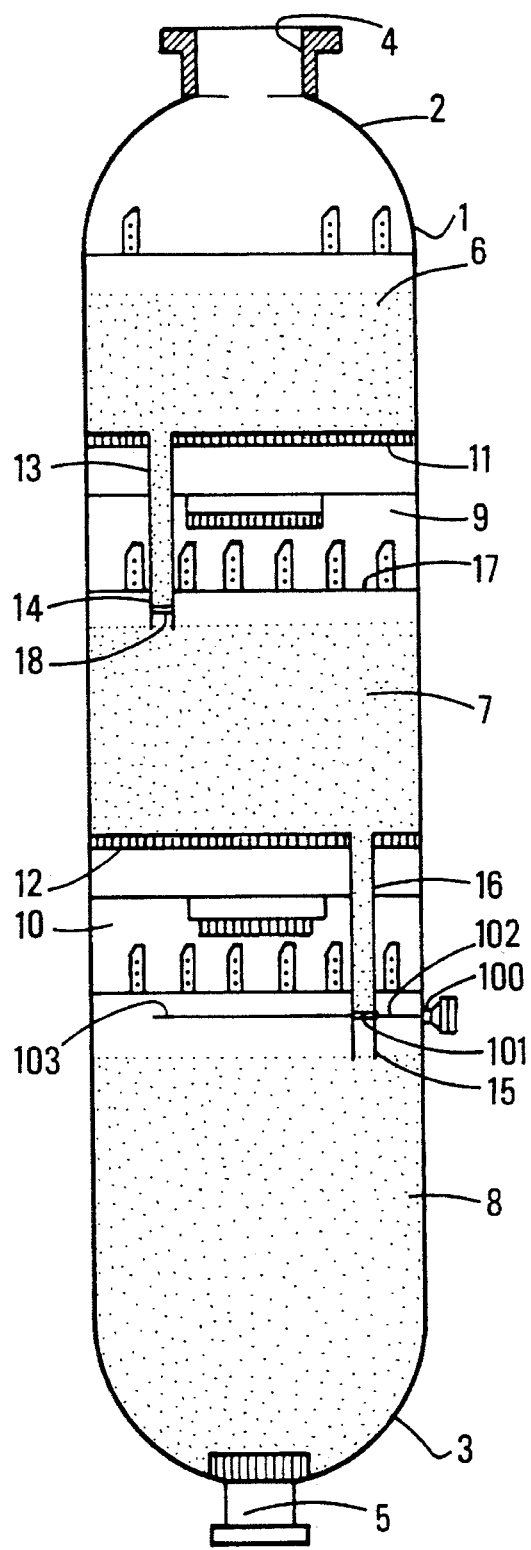
FIG. 1 shows a vertical vessel according to the invention.

The vessel 1 shown in FIG. 1 is a cylinder with its axis vertical, being closed by a top 2 and a bottom 3. A vessel with an inclined axis may be equally suitable, provided that the solid material can flow away under the effect of gravity.

The solid material of the beds is loaded into the vessel by way of an opening 4 provided in the top 2 (which may have other uses) and the solid material of the lowest bed is discharged by way of an opening 5 provided in the lower portion of the reactor.

The vessel comprises at least two beds containing a solid material. Shown in FIG. 1 are three consecutive beds 6, 7 and 8 which are in superposed relationship and separated by a bed spacing as referenced 9 and 10 respectively.

The solid material of each bed rests on a support plate 11, 12, while the last bed can rest directly on the bottom.

In accordance with the invention, disposed between two successive beds, for example beds 6 and 7, is at least one pipe 13 connecting the beds together.

The pipe 13 must have its upper end at the lowest level of the upper bed 6 in such a way that the maximum amount of material of the bed 6 flows away by way of the open pipe.

Thus, in FIG. 1, the above-mentioned end reaches the level of the support plate 11 of the bed 6.

Advantageously the support plates are of a slightly conical shape, the pipe being disposed at the point of the cone which is directed downwardly, so as to prevent material from being retained on the plate.

The pipe may be welded or assembled to the support plate by any other means. Preferably it comprises a ring which is supported on the plate, that mode of construction facilitating dismantling.

The lower end 14 of the pipe 13 reaches the lower bed 7 and can even partly penetrate into same, as is shown in respect of the end 15 of the pipe 16 in the bed 8. If necessary the pipe passes through the internal devices 17.

To prevent mixing of material as between the beds when the vessel is in operation or upon discharge, the pipe is provided with at least one closure means 18 connected to a means for the remote control of opening thereof.

The closure means must provide for closure of the pipe when the vessel is loaded and it must open under the action of the remote control means, for discharge of the material.

FIGS. 2 to 13 show different embodiments of the closure and control means.

Figure 2:
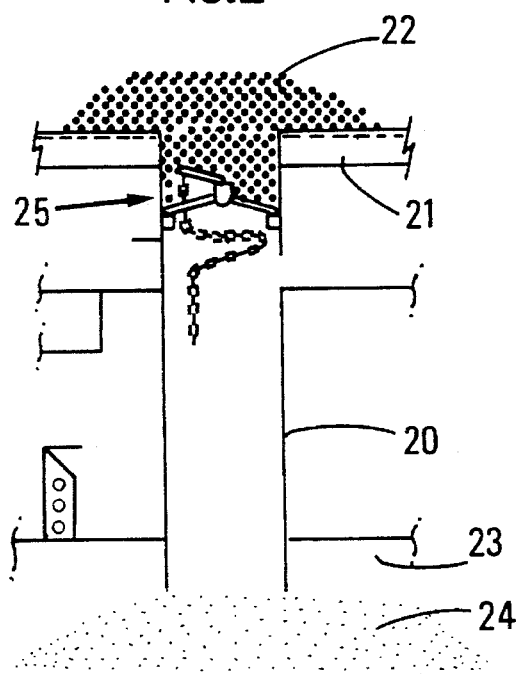
Figure 3:
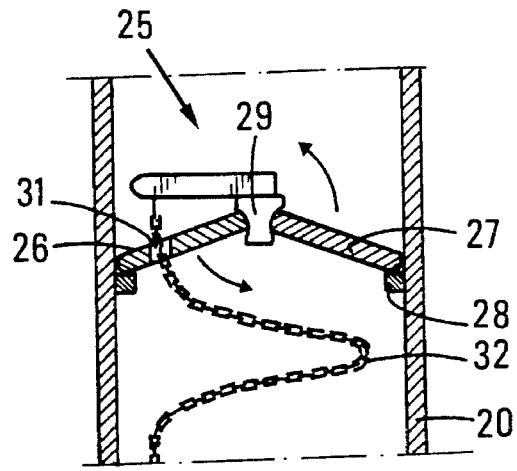

FIG. 2 shows pipe 20 connecting the support plate 21 of a bed 22 to a bed 24.

The closure means 25 is formed (see FIG. 3) by at least two plate members indicated at 26 and 27 which are laid in the interior of the pipe symmetrically with respect to its axis (D). The plate members are supported at their lower ends on supports 28 and at their upper ends on a portion 29 disposed on the axis (D) and forming a keystone member.

It is of course the case that the shape of the plate members is adapted to that of the internal wall of the pipe.

Such a 'vaulted' structure is braced against the internal walls of the pipe under the effect of the load of material of the upper bed 22.

The means for remote control of opening of the closure means 25 is in this case advantageously formed by a chain 32.

The chain 32 is fixed to the keystone member 29 and has a free end at the lower end (which preferably passes through the opening provided in the bottom of the vessel), and the chain is fixed to an arm 30 (forming a lever) mounted on the keystone member 29 and the chain passes through an aperture 31 provided in at least one plate member, in this case the plate member 26.

The pulling force can also be applied by way of the top of the reactor.

Figure 4:
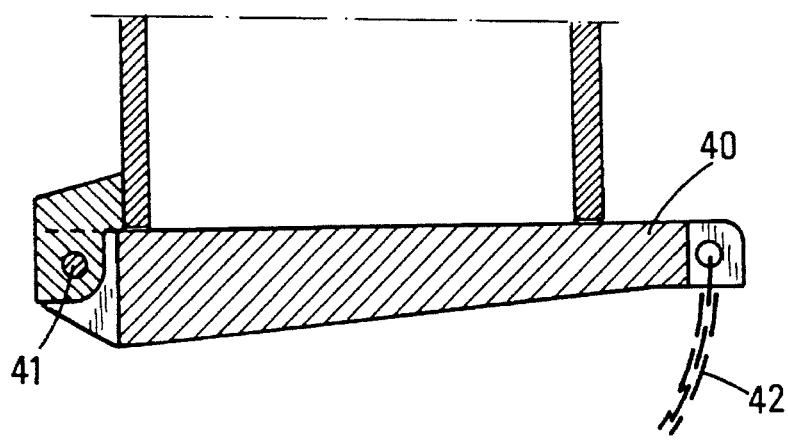

FIG. 4 shows another embodiment in which the closure means is formed by a pivoting plate member 40 having a horizontal axis of rotation 41.

In the closed position, the plate member is held in position under the pipe by a shearable pin which passes through the shaft 41 (which is then prevented from rotating), the pin being broken under the effect of the pulling force applied to the chain 42. The plate member then pivots into the vertical position to open the opening of the pipe.

Any other means for locking the plate member in the closure position may be suitable when unlocking can be effected by virtue of the action of the control means.

Figure 5:
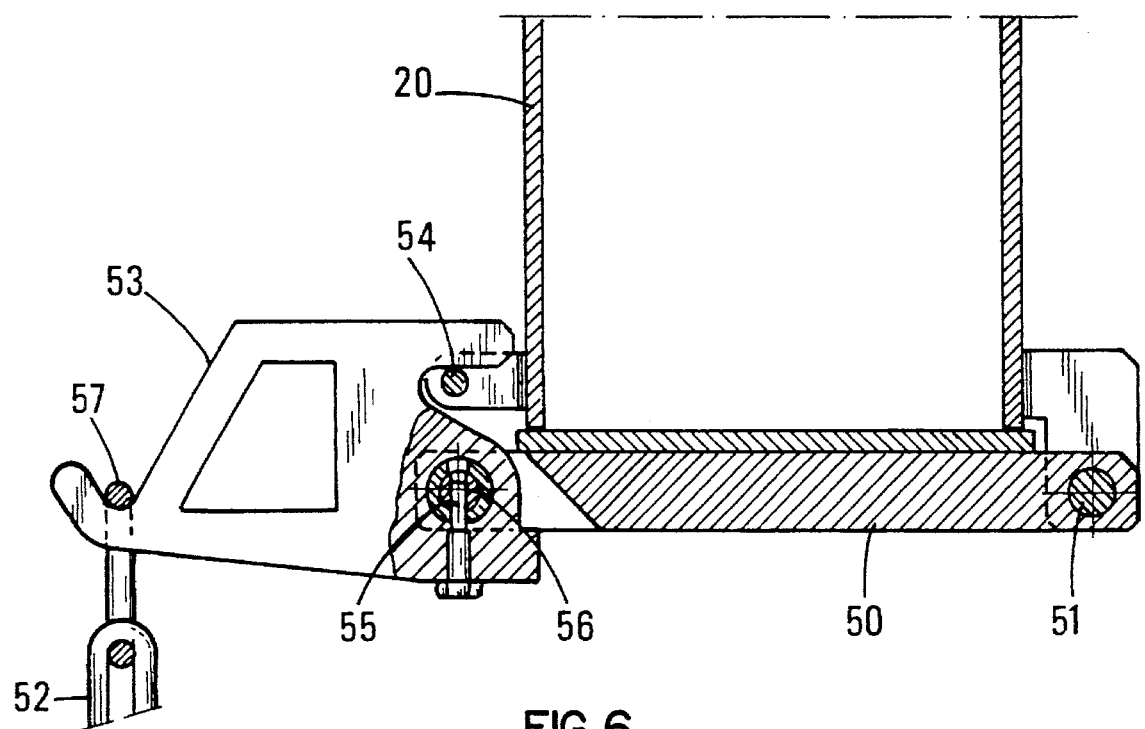

The alternative construction shown in FIG. 5 also comprises a plate member 50 which pivots about a horizontal axis 51 under the effect of a pulling force applied to a chain 52.

More precisely the end of the plate member which is remote from the shaft 51 is provided with a portion 53 forming a lever.

When the plate member 50 is in the closure position, the lever 53 bears against a support 54 and the position is locked by a shearable pin 55 placed on the shaft 56 for rotary movement of the lever, said shaft being carried by the plate 50.

The chain 52 which here constitutes the remote control means is fixed to the lever 53 (fixing point 57).

Figure 6:
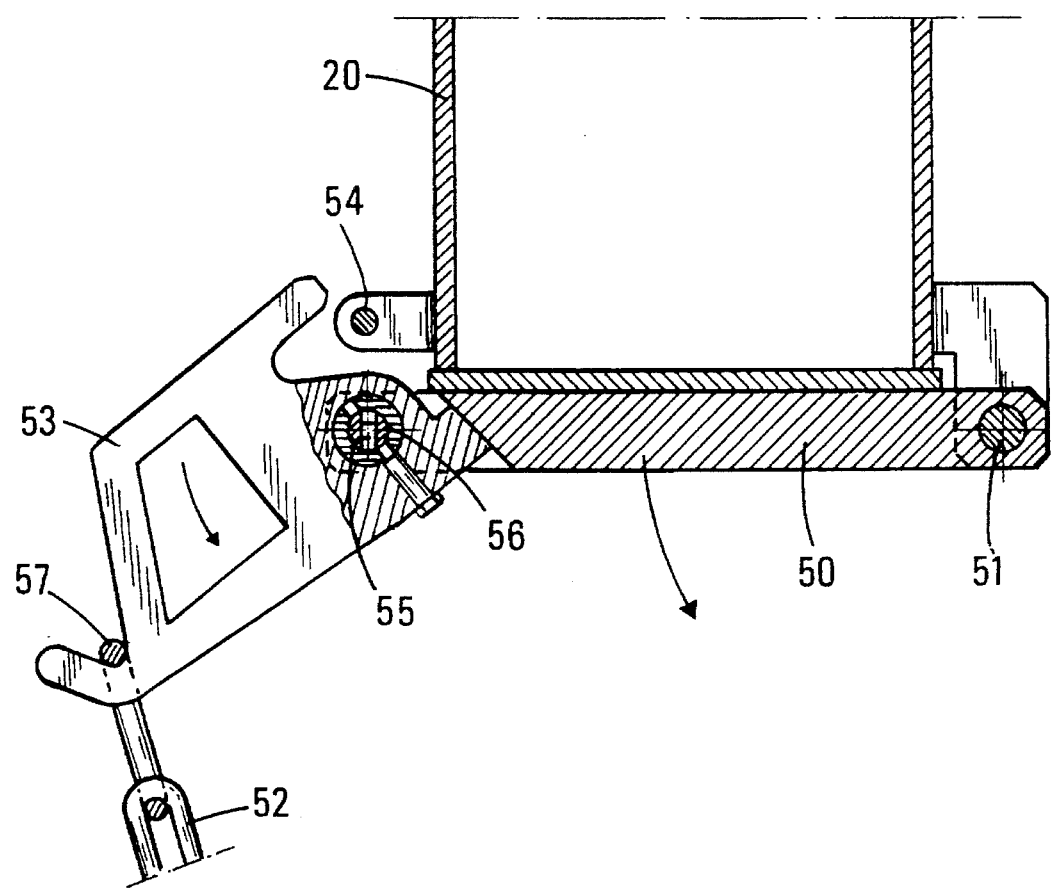
Figure 10:
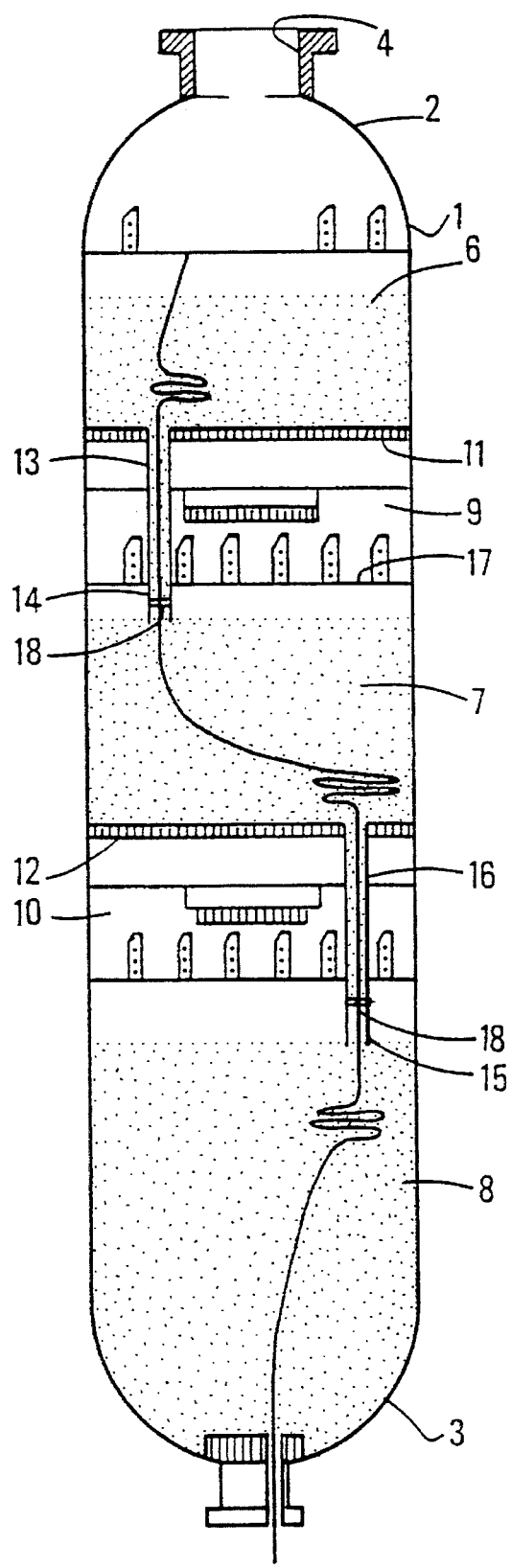
Figure 11:
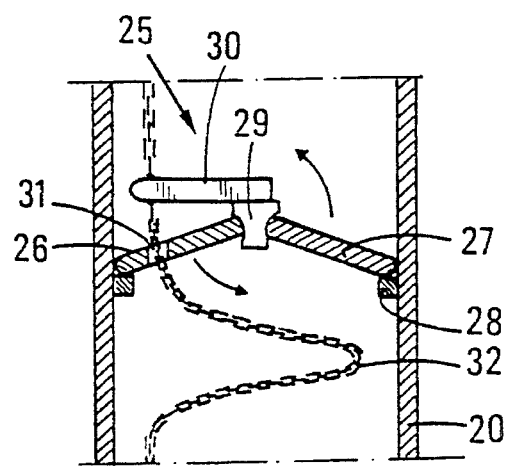
Figure 12:
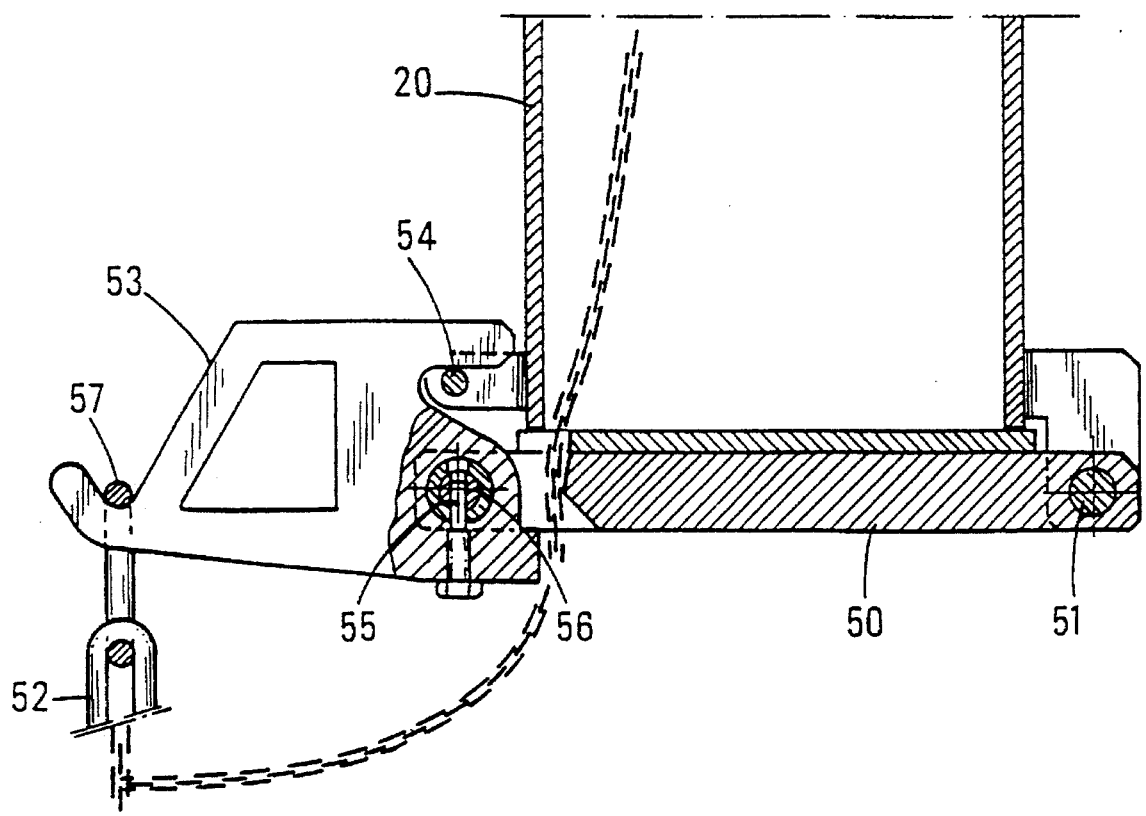
Figure 13:
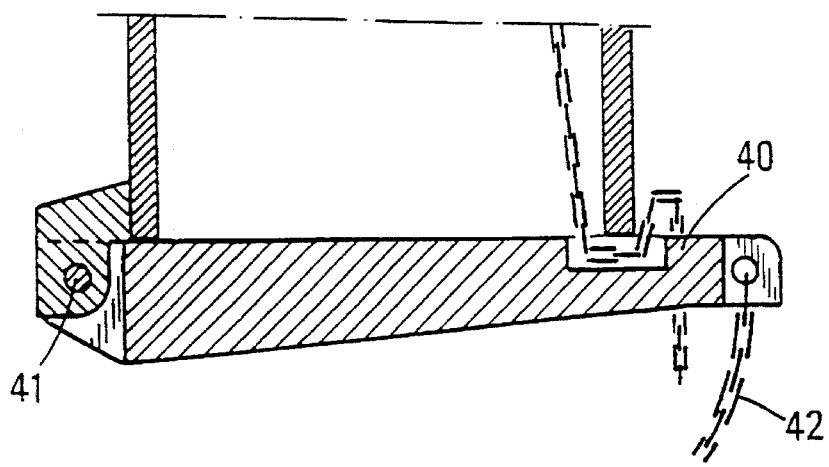

Under the effect of a pulling force applied to the chain 52, the pin 55 breaks, the lever 53 can then turn about the axis 56, becoming disengaged from the support 54 (see FIG. 6). The plate member with the lever then pivot.

The additional advantage of using a chain is that of being able to 'poke out' or 'rake out' the pipe (clean it by virtue of the movements of the chain). For that purpose, the chain is removably fixed to the point 57 and an aperture for the chain to pass therethrough is provided in the closure means. That being the case at the level of each pipe, the chain passing through all the pipes. They then advantageously have the same axis (D).

Figure 7:
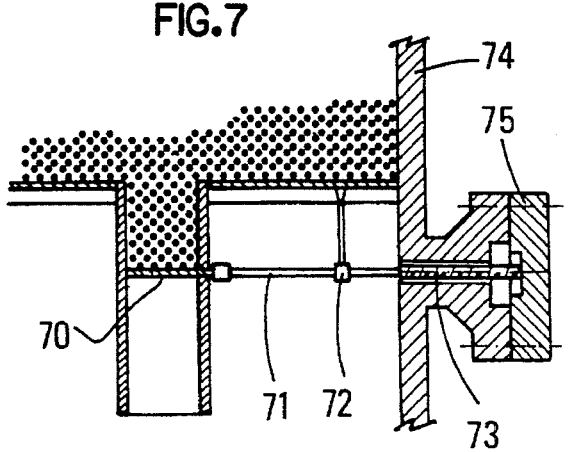
FIGS. 2 to 13 show different embodiments of pipe closure means, associated with a control means.
Figure 8:
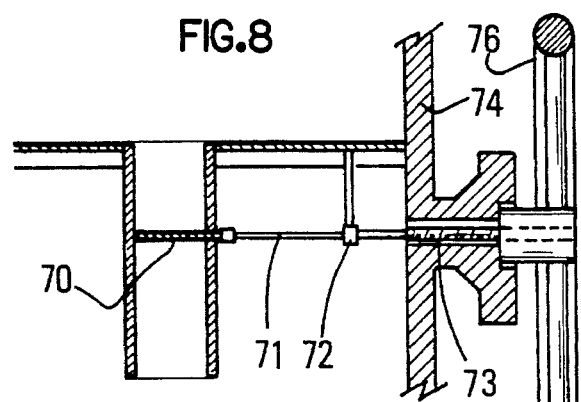
Figure 9:
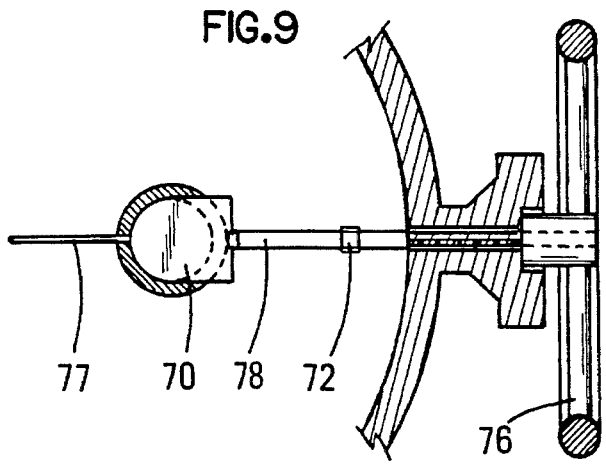

FIG. 7 shows an embodiment with a plate member 70 which is displaced laterally by a bar 71 which is accessible from the exterior of the vessel. The plate member 70 can be disposed at any level in the pipe. It is fixed to a bar 71 (which can be held in the vessel by a support means 72), which extends out of the vessel by way of a tapping assembly 73 mounted on the wall 74.

In the closure position a collar 75 ensures sealing integrity on the tapping assembly and the bar.

To move the plate 70 away, the collar 75 is removed and a means 76 is fitted (FIG. 8) to pull the bar from the exterior (boosted pulling force).

Advantageously (see FIG. 9), the tapping assembly 73 is used to fit in position at least one thermocouple 77 which is slid into a tube 78 in which the bar 71 also passes. That thus provides measurement of the temperature in the vessel, and better at the level of each bed.

Figure 14:
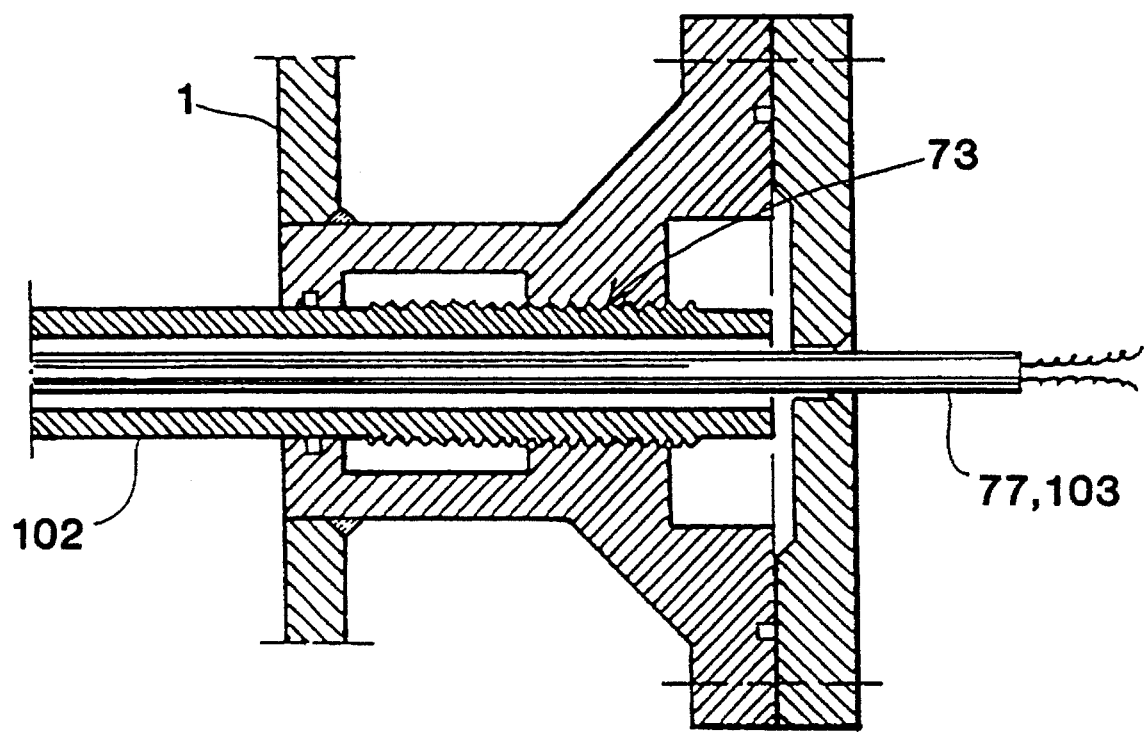
FIG. 14 is detailed view of the mounting of a thermocouple.

Such a construction is shown in FIG. 14 and is mounted on the pipe 16 in FIG. 1, with a tapping assembly 100, a plate member 101 and a tube 102 from which the thermocouple 103 extends.

Thus when the vessel is in operation the beds of solid material remain separated and there is no transfer of material under the effect of compacting of the lower bed.

Upon discharge it is then only necessary to discharge the opening 5, starting from the lowest bed, bed by bed.

The bed 8 is discharged, the upper pipes being closed. Then, by acting on the remote control means (operating therefore from the exterior of the vessel) the upper pipe (here 16) is opened and the solid material of the bed 7 then flows away and is recovered. It is then only necessary to open the pipe 13 in order for the material of the bed 6 to be discharged on to the lower plate 12, then by way of the pipe 16 into the bottom 3 and the opening 5.

The invention set forth in this application, besides solving the problem specified, is also found to be a particularly attractive proposition when at least two beds contain different solid materials. Another advantage is that of being able to use the pipes for loading the beds.

In addition the invention is entirely suitable for processes requiring high pressures (at least 50 bars) since it makes it possible either not to provide fresh openings in the high-pressure apparatus or to use the existing openings.

It is also noted that it avoids coking of the catalyst which could have been present in the pipe in the absence of the closure means, such presence resulting from compacting of the lower bed.

We claim:

1. A process of discharging solids from a vessel comprising at least three successive beds of solid particulate material, at least two of said beds being of a different solid material from one another, the solid material of at least two beds being each supported by a support plate provided with at least one pipe, thereby connecting the at least three successive beds with one another, each of at least two of said support plates being provided with closure means associated with at least one pipe in each of said two support plates, said closure means being connected to remote control means for opening and closing said closure means, and said vessel also comprising at least one opening in said upper portion for loading of the beds and at least one opening in said lower portion for the discharge of solid material, comprising:

opening the lowermost closure means while maintaining the remaining closure means in the closed position;

discharging the lowermost bed from the vessel;

after the lowermost bed is removed from the vessel, opening the next-to-lowermost closure means to permit the next-to-lowermost bed of solids to replace the lowermost bed; and repeating this operation up through all of the beds so that each bed eventually replaces the lowermost bed, without mixing of beds, and discharging each bed separately from the vessel.

2. A process according to claim 1, wherein the two different solid materials of the beds are two different catalysts.

3. A process according to claim 1, wherein each bed weighs about 30 to 40 tons.

4. The process of claim 1, wherein the different solid materials are different catalysts.

5. The process of claim 1, conducted at a pressure of at least 50 bars.

6. A process according to claim 1, wherein said at least one pipe extends downwardly through space in between said beds, said space being devoid of solid particulate material and said at least one pipe having a lower end proximate a lower successive bed of solid particulate material.

7. A process according to claim 1 wherein the remote control means is formed by a chain which is fixed to the closure means and which passes through the lower opening of the vessel and which is pulled from the exterior to free the opening of the pipe.

8. A process according to claim 7, wherein a single chain connects all the pipes.

9. A process according to claim 1, wherein the closure means is formed by a plate member which is displaceable laterally by a bar connected to said plate member and passing through the wall of the vessel.

10. A process according to claim 9 wherein the bar is disposed in a tube into which a thermocouple also passes.

11. A process according to claim 1, wherein the closure means is formed by two plate members disposed in the interior of the pipe symmetrically with respect to the axis of the pipe, said plate members being supported on one hand on the internal wall of the pipe and on the other hand by a keystone member, said keystone member being connected to the remote control means so that, said means being actuated, said keystone member is released from the plate members which move apart to free the opening of the pipe.

12. A process according to claim 11, wherein the remote control means is formed by a chain which is fixed to the closure means and which passes through the lower opening of the vessel and which is pulled from the exterior to free the opening of the pipe.

13. A process according to claim 1, wherein the closure means is formed by a plate member which pivots about a horizontal axis by the action of the remote control means.

14. A process according to claim 13, wherein the remote control means is formed by a chain which is fixed to the closure means and which passes through the lower opening of the vessel and which is pulled from the exterior to free the opening of the pipe.

15. A process according to claim 13, wherein the two different solid materials of the beds are two different catalysts.

16. A process according to claim 13, wherein each bed weighs about 30 to 40 tons.

17. A process according to claim 13, wherein said at least one pipe extends downwardly through space in between said beds, said space being devoid of solid particulate material and said at least one pipe having a lower end proximate a lower successive bed of solid particulate material.

18. A process according to claim 13, wherein the plate member is provided with a portion forming a lever which is mounted on a horizontal axis carried by the plate member, a locking means preventing rotary movement of the lever about said axis when the plate member is in the closure position, unlocking being effected by actuation of the remote control means, carried by the lever, the lever then pivoting about its axis and entraining the plate member.

19. A process according to claim 18, wherein the remote control means is formed by a chain which is fixed to the closure means and which passes through the lower opening of the vessel and which is pulled from the exterior to free the opening of the pipe.

20. A process according to claim 19, wherein a single chain connects all the pipes.

* * * * *